United States Patent [19]

Itoh et al.

[11] Patent Number: 5,652,309

[45] Date of Patent: Jul. 29, 1997

[54] METHOD OF PREPARING WATER-ABSORBING RESIN

[75] Inventors: Kiichi Itoh; Seiichiro Iida, both of Yokkaichi, Japan

[73] Assignee: Mitsubishi Chemical Corporation, Tokyo-to, Japan

[21] Appl. No.: 671,621

[22] Filed: Jun. 28, 1996

[30] Foreign Application Priority Data

Jun. 28, 1995 [JP] Japan .................... 7-161904

[51] Int. Cl.$^6$ ........................ C08F 2/20
[52] U.S. Cl. .................. 525/243; 525/252; 525/267; 526/317.1
[58] Field of Search ........................ 525/243, 252, 525/267; 526/317.1

[56] References Cited

U.S. PATENT DOCUMENTS

| | | | |
|---|---|---|---|
| 3,458,603 | 7/1969 | Griffin et al. | 525/252 X |
| 4,652,511 | 3/1987 | Ueda et al. | 430/137 |
| 5,115,031 | 5/1992 | Heim et al. | 525/243 |
| 5,180,798 | 1/1993 | Nakamura et al. | 526/66 |
| 5,548,047 | 8/1996 | Ito et al. | 526/240 |

FOREIGN PATENT DOCUMENTS 00356241  2/1990  European Pat. Off. .

*Primary Examiner*—Irina S. Zemel
*Attorney, Agent, or Firm*—Oblon, Spivak, McClelland, Maier & Neustadt, P.C.

[57] ABSTRACT

A method of preparing a water-soluble resin, which comprises the steps of: subjecting an aqueous solution of a first water-soluble ethylenically unsaturated monomer to a first-stage water-in-oil type of reverse-phase suspension polymerization using a water-soluble radical polymerization initiator in a hydrophobic organic solvent in the presence of an emulsifier and optionally a crosslinking agent, thereby forming a slurry containing hydrous polymer gel particles; adding to said slurry a nonionic or anionic surface active agent having an HLB of at least 7 and higher than that of said emulsifier and an aqueous solution of a second water-soluble ethylenically unsaturated monomer so as to absorb the aqueous solution of the second monomer in said hydrous polymer gel particles; and carrying out a second-stage polymerization of said second monomer.

8 Claims, No Drawings

METHOD OF PREPARING WATER-ABSORBING RESIN

BACKGROUND OF THE INVENTION

1. Field of the Invention

The present invention relates to a method of preparing a water-absorbing resin. More specifically, the present invention is concerned with an improved seed-polymerization method of preparing a water-absorbing resin wherein a specific surface active agent is employed.

According to the preparation method of the present invention, a granulated polymer having a desired average particle diameter of 200 to 3,000 μm with a narrow particle size distribution can be readily obtained. The granulated product contains few fine powder and has a high cohesion strength. Further, the granulated product exhibits a high speed of water absorption. Accordingly, the granulated product can be advantageously used not only for sanitary goods such as paper diapers and sanitary napkins but also for agricultural purposes (soil water retainers for instance) and for civil engineering and construction purposes (waterstop materials and dew preventives for instance).

2. Background Art

In recent years, water-absorbing resins have been widely used for sanitary goods such as paper diapers and sanitary napkins, for industrial purposes (as waterstop materials, dew preventives, freshness retainers and solvent dehydrators), and for planting-trees and agricultural and horticultural purposes, and various water-absorbing resins have been employed.

Among known water-absorbing resins there are hydrolyzates of starch-acrylonitrile graft copolymers, crosslinked carboxymethylcellulose, crosslinked polyacrylic acids (salts), acrylic acid (salt)-vinyl alcohol copolymers, crosslinked polyethylene oxides, and the like.

However, the conventional water-absorbing resins are all less than satisfactory in term of particle diameter. Polymers prepared by reverse-phase suspension polymerization in particular offer many problems. For instance, JP-A-53-46389 (cf. JP-B-54-30710) discloses a method of preparing a desired polymer having a water absorption capacity of at least 400 and capable of being powdered by dispersing and suspending an at least 40% by weight aqueous solution of an alkali metal acrylate containing a water-soluble radical polymerization initiator in a petroleum type of aliphatic hydrocarbon solution in the presence of a sorbitan fatty acid ester having an HLB of 3 to 6, followed by polymerization in the absence of a crosslinking agent; JP-A-57-167302 discloses a method of preparing a highly water-absorbing polymer material having an average particle diameter of 1 to 40 μm by adding an organic solvent to a 5 to 40% by weight aqueous solution of an α,β-unsaturated carboxylic acid monomer or a metal salt thereof at a volumetric ratio of 1 to 4 relative to the aqueous monomer solution, and adding to the aqueous solution 0.1 to 20% by weight of a nonionic surface active agent as a dispersant and 0 to 10% by weight of a crosslinking agent, followed by a water-in-oil type of reverse-phase suspension polymerization at 200° C. or lower in the presence of a radical polymerization initiator; and JP-A-56-131608 (cf. JP-B-60-25045) discloses a method of preparing a water-absorbing agent with the capability of absorbing water being high with respect to not only pure water but also an aqueous solution of electrolyte by suspending an aqueous solution of acrylic acid and an alkali acrylate partially neutralized to a neutralization degree of about 50 to 98 molt with an alkali such as NaOH or NH$_4$OH in an alicyclic or aliphatic hydrocarbon solvent in which a surface active agent having an HLB of 8 to 12 coexists and carrying out reverse-phase suspension polymerization in the presence of a water-soluble radical polymerization initiator and, if necessary, a crosslinking agent in an amount of about 0.005 to 5.0% by weight relative to the monomer.

However, when a water-in-oil type (hereinafter sometimes called W/O type) of reverse-phase suspension polymerization of an alkali metal acrylate is carried out using as a dispersant a sorbitan fatty acid ester having an HLB of 3 to 6 as described in JP-A-53-46389 (JP-B-54-30710), a nonionic surface active agent having an HLB of 6 to 9 as described in JP-A-57-167302 or a surface active agent having an HLB of 8 to 12 as disclosed in JP-A-56-131608 (JP-B-60-25045), the obtained water-absorbing resins are all found to have a small particle diameter of about 10 to 100 μm.

On the other hand, JP-A-57-94011 (cf. JP-B-63-36321) discloses a method of preparing a high-molecular material excellent in water absorption properties by the water-in-oil type of reverse-phase suspension polymerization of an α,β-unsaturated carboxylic acid monomer and/or an alkali metal salt thereof in the presence of a crosslinking agent using as a dispersant a carboxyl group-containing polymer having an affinity with an organic solvent, and JP-A-57-98512 (cf. JP-B-63-36322) discloses a method in which about 0.01 to 1% by weight of a water-soluble catalyst and 0.01 to 20% by weight of a dispersant (a polymer containing at least about 0.01 mole of carboxyl group and having a molecular weight of at least about 500) are added to an α,β-unsaturated carboxylic acid monomer and/or a metal salt thereof and reverse-phase suspension polymerization is conducted at about 40 to 100° C. under agitation in a medium consisting of water and an organic solvent at a weight ratio of about 0 to 50: about 100 to 50. When a carboxyl group-containing lipophilic polymer is used as a dispersant as set forth in JP-A-57-94011 (cf. JP-B-63-36321) and JP-A-57-98512 (cf. JP-B-63-36322), polymers of several hundred μm in particle diameter may be obtained, but there is a problem that a large mass is likely to be formed during the polymerization due to a high affinity between the dispersant and the acrylic monomer.

As a method for increasing the particle size of water-absorbing resins, it is known to use as a dispersant an oil-soluble cellulose ester or cellulose ether as disclosed in JP-A-57-158209 (cf. JP-B-1-17482) and JP-A-57-158210. More specifically, JP-A-57-158209 discloses a method for carrying out suspension polymerization by adding a water-soluble radical polymerization initiator to an aqueous solution of a water-soluble ethylenically unsaturated monomer to which about 0.01 to 5% by weight of a crosslinking agent is added, and adding the resulting solution dropwise under agitation to a hydrophobic dispersion medium (a halogenated aromatic hydrocarbon) having about 0.05 to 10% by weight of a protective colloid added thereto, said protective colloid being an oil-soluble cellulose ester or ether which is insoluble in the dispersion medium at normal temperature but soluble therein at the polymerization temperature (of at least about 40° C.); and JP-A-57-158210 discloses a method for carrying out an oil-in-water type of suspension polymerization by adding a persulfate as a polymerization initiator to an aqueous solution of a water-soluble ethylenically unsaturated monomer, and adding the resulting solution dropwise under agitation to a hydrophobic dispersion medium to which a cellulose ester or ether soluble in the medium at a temperature above about 40° C. has been added as a protective colloid".

Problems with such methods are, however, that the remnants of the dispersant melt upon drying of the polymer, making the polymer liable to agglomerate and stick to the wall of equipment used.

Further, JP-A-62-172006 discloses a method of preparing a water-absorbing resin by polymerizing an at least 25% by weight aqueous solution of an α,β-unsaturated carboxylic acid and an alkali metal salt thereof in a petroleum hydrocarbon solvent using a radical polymerization initiator and, if required, in the presence of a crosslinking agent, wherein a polyglycerin fatty acid ester having an HLB of 2 to 16 is used as a surface active agent. According to this method, the use as a dispersant of the polyglycerin fatty acid ester having an HLB of 2 to 16 can produce a polymer having a large particle diameter. However, there is a problem with this method that the permissible range of preparation conditions for producing the polymer in a stable manner is very narrow; in other words, if there is a departure from these conditions, bulk polymerization is liable to occur. Thus, this method is unfavorable for industrially stable preparation.

As an alternative to the aforesaid methods, a method of granulating (agglomerating) primary particles of water-absorbing resins by using a binder such as water or polyvinyl alcohol has been proposed in the art, as disclosed in JP-A-2-308820. However, this method, when carried out using water as a binder, offers a problem that the agglomerated primary particles readily disintegrate during delivery or handling because of low cohesion strength between the primary particles. When polyvinyl alcohol is used as a binder, some improvement may be made in the cohesion strength. However, another problem arises; some extra expense is incurred because a lot of polyvinyl alcohol and special equipment are needed.

Furthermore, JP-A-62-230813 discloses a seed polymerization method of preparing a polymer having an average particle diameter of 100 μm or larger by forming a dispersion in a non-aqueous liquid of water-absorbing resin seed particles formed from a first monomer, allowing an aqueous solution of a second water-soluble ethylenically unsaturated monomer to be absorbed in the seed particles, and then polymerizing the second monomer. This patent document states publication alleges that water-absorbing resins which are larger than the seed particles or in which the seed particles agglomerate to a large particle diameter are obtainable according to this method. However, this method, too, has some drawbacks. That is, the same dispersant (the W/O type of dispersant) or stabilizer as used with the first monomer is used for the polymerization of the second monomer, and so remains dissolved in the solvent. When the aqueous solution of the second monomer is added to the system under such conditions, the aqueous solution of the second monomer is placed in a suspended state before absorbed in hydrous gel particles obtained by the first-stage polymerization, and so the rate of the second monomer to be absorbed in the seed particles becomes very slow. It is thus difficult to obtain agglomerates having a high cohesion strength.

Still furthermore, JP-A-3-227301 discloses a method of preparing a water-absorbing resin by carrying out a process which involves subjecting an aqueous solution of a water-soluble ethylenically unsaturated monomer to a first-stage reverse-phase suspension polymerization in a petroleum hydrocarbon solvent using a radical polymerization initiator in the presence of a surface active agent and/or a high-molecular protective colloid .and, if required, in the presence of a crosslinking agent, thereby forming a slurry containing the resulting polymer particles followed by cooling for the precipitation of the surface active agent and/or high-molecular protective colloid, and then adding to said slurry an aqueous solution of a water-soluble ethylenically unsaturated monomer containing a radical polymerization initiator and, if required, a crosslinking agent to carry out an additional reverse-phase suspension polymerization. Thus, this document teaches a seed polymerization method of preparing a water-absorbing resin, which is similar to that mentioned above, except that the slurry after the completion of the first-stage reverse-phase suspension polymerization is cooled to allow the surface active agent and/or high-molecular protective colloid to be precipitated out of the solvent before the aqueous solution of the second-stage monomer is added. The document states that a water-absorbing resin having a reduced fine powder content and a sharp particle size distribution can be obtained by the polymerization process according to this method, because the first-stage slurry is cooled so as to precipitate the surface active agent and/or high-molecular protective colloid, thereby inhibiting the surface active function, i.e., preventing the formation of a suspension, viz., a W/O type of emulsion of the second-stage aqueous monomer solution and so ensuring sufficient monomer absorption.

This method takes aim at precipitating the surface active agent by cooling to inhibit the surface active function. In practical applications, however, the surface active agent and/or high-molecular protective colloid are composed of several components which vary largely in terms of precipitation temperature. To achieve complete precipitation of such a substance comprising multiple components, it is occasionally required to select extremely severe conditions such as sub-zero conditions; however, this is practically almost impossible. In practice, therefore, precipitation of important components only will be achieved at best. Thus, some components of the W/O type surface active agent and/or high-molecular colloid remain dissolved in the slurry, and so are largely detrimental to the absorption of the second-stage aqueous monomer solution by the first polymer. The resulting water-absorbing resin has a considerable fine powder content, and even if primary particles agglomerate into a granule, its cohesion strength distribution is insufficient.

Moreover, the speed of absorption of the second monomer solution into the first polymer significantly drops by the cooling of the slurry system, and several tens of minutes to several hours are needed for achieving sufficient absorption. Accordingly, when an acrylic monomer, which is of extremely vigorous polymerizability, is employed, not only is there much risk of unusual polymerization during absorption, but an increased process time is needed as well. Thus, the process is very awkward with a decreased productivity.

Finally, JP-A-6-184211 discloses an improved method for preparing a water-absorbing agent by the seed polymerization of an acrylic monomer, wherein the first-stage polymerization of a water-soluble unsaturated monomer in a hydrocarbon solvent medium is conducted using a specific radical-polymerization surfactant which is to be taken up in the resultant seed polymer and thus vanishes from the medium when the first-stage polymerization is completed, and then a second monomer is added to the system to carry out the second-stage polymerization.

This publication stresses that this method is advantageous in that an excessive portion of the surfactant present in the medium can be vanished from the system without resorting to cooling of the system and thus the absorption of the second monomer into the seed polymer can be conducted at a relatively high temperature. This method may theoretically be a very interest procedure, but it in fact has some problems. For instance, a considerable amount of unpolymerized matter remains in the first-stage polymerization irrespective of the use of the specific radical-polymerizable surfactant. Further, to physically stabilize the reaction product in the suspension, the publication suggests the use of a combined protective colloid and emulsifier as a co-surfactant. In this regard, the publication states that modified cellulose, and polyethylene oxidized or modified with maleic anhydride or a copolymer thereof may be used to this end. Thus, the specific radical-polymerizable surfactant used is poor in emulsion stabilizing effect, and with the single use thereof it is impossible to obtain seed particles in a stable manner. As will be understood from the above, the specific radical-polymerizable surfactant not taken up in the seed polymer, or the co-surfactant still remains in the medium, whereby a W/O type of emulsion system is formed upon the addition of the second monomer to the system. As a result, the absorption of the second monomer in the seed polymer is impaired, leading to a final product of poor granule properties.

An object of the present invention is to overcome the above drawbacks in the prior art and provide an improved method of preparing a water-absorbing resin in the form of granules by the seed polymerization of an ethylenically unsaturated monomer, which can provide, in a simple and stable manner, a granulated polymer having an advanced cohesion strength with an increased granulation efficiency.

SUMMARY OF THE INVENTION

It has now been found that, in carrying out the seed polymerization of an ethylenically unsaturated monomer, the use of a specific surface active agent in the second stage enables an effective and rapid absorption of the second monomer in the seed polymer particles, providing a final granulated polymer having a desired average particle size in the range of from 200 to 3,000 μm with a narrow particle size distribution, having an enhanced cohesion strength, and exhibiting an increased speed of water absorption. Based on this finding, the present invention has been accomplished.

Thus, the present invention provides a method of preparing a water-soluble resin, which comprises the steps of: subjecting an aqueous solution of a first water-soluble ethylenically unsaturated monomer to a first-stage water-in-oil type of reverse-phase suspension polymerization using a water-soluble radical polymerization initiator in a hydrophobic organic solvent in the presence of an emulsifier and optionally a crosslinking agent, thereby forming a slurry containing hydrous polymer gel particles; adding to said slurry a nonionic or anionic surface active agent having an HLB of at least 7 and higher than that of said emulsifier and an aqueous solution of a second water-soluble ethylenically unsaturated monomer so as to absorb the aqueous solution of the second monomer in said hydrous polymer gel particles; and carrying out a second-stage polymerization of said second monomer.

The present invention have the following advantages:

(1) The absorption of the second aqueous monomer solution in the polymer gel particles (seed particles) can be carried out very rapidly and efficiently. Therefore, even an acrylic monomer of vigorous polymerizability can be added at a relatively high temperature to the first-stage slurry system for absorption.

(2) A single particle form of fine powder polymer is unlikely to be produced even with a high speed of agitation employed at the second stage.

(3) The absorption of the second aqueous monomer solution in the seed polymer can be carried out at any desired temperature. Thus, in contrast to the method set forth in the aforesaid JP-A-3-227301, there is no need for cooling of the system for the precipitation of the emulsifier and surface active agent.

(4) By a suitably selecting the type and amount of the surface active agent used it is possible to desirably vary the average particle diameter and cohesion strength of the end product.

(5) The quantitative ratio of the second aqueous monomer solution to the first aqueous monomer solution can be varied within a vary wide range; it is possible to achieve the intended granulation even with the use of a very small amount of second aqueous monomer solution. In this regard, according to the seed polymerization method disclosed in the aforesaid JP-A-3-227301, the lower limit of the amount of the second aqueous monomer solution is taught to be 50% of that of the first aqueous monomer solution. The publication states that the desired advantages cannot be obtained with the use of the second monomer solution in an amount below the lower limit.

(6) The granular product obtained according to the present invention can absorb water at an extremely high speed.

DETAILED DESCRIPTION OF THE INVENTION

The present invention will now be explained in more detail below.

(1) Water-Soluble Ethylenically Unsaturated Monomer

Any desired water-soluble ethylenically unsaturated monomer can be used in the present invention. Exemplary monomers are ionic monomers such as (meth)acrylic acid and/or an alkali metal or ammonium salt thereof, and 2-(meth)acrylamide-2-methyl sulfonate and/or an alkali metal salt thereof; nonionic monomers such as (meth) acrylamide, N,N-dimethylacrylamide, 2-hydroxyethyl (meth)acrylate, and N-methylol(meth)acrylamide; and amino group-containing unsaturated monomers such as diethylaminoethyl (meth)acrylate, and dimethylaminopropyl (meth)acrylate, or a quaternary salt thereof; and these monomers may be used singly or in combination of two or more. The term "meth(acrylic)" herein means "acrylic" or "methacrylic".

Preferable among these are (meth)acrylic acid and/or an alkali metal or ammonium salt thereof, and (meth) acrylamide. The alkali metal salt used herein may be sodium salt, potassium salt, lithium salt, and rubidium salt by way of example alone. However, preference is given to the sodium or potassium salt in the light of polymer performance, commercial availability and safety.

The concentration of the water-soluble ethylenically unsaturated monomer in the aqueous solution is generally at least 20% by weight, preferably 25% by weight to saturation concentration. The (meth)acrylic acid, 2-(meth)acrylamide-2-methyl sulfonate, etc., may be used in the form partly or wholly neutralized with an alkali metal or ammonium compound. Then, the degree of neutralization is generally in the range of 20 to 100 mol %, preferably 30 to 100 mol %.

According to the present invention, the monomer to be used at the second polymerization stage (second monomer) may be of the same kind as, or different from, the monomer to be used at the first polymerization stage (first monomer). When the same monomers are used at the first and second polymerization stapes, the monomer concentrations of the respective aqueous solutions and the degrees of neutralization of the monomers can be different from each other within the above ranges.

(2) Emulsifier for the First-Stage Polymerization

Any desired emulsifier can be used for the first-stage polymerization on condition that it is soluble in, or has an affinity for, a hydrophobic solvent and can basically form a W/O type of emulsion system. More specifically, a nonionic emulsifier and/or an anionic emulsifier having an HLB of generally 1 to 9, preferably 2 to less than 7 are preferred.

Examples of such emulsifiers include sorbitan fatty acid ester, polyoxysorbitan fatty acid ester, sucrose fatty acid ester, polyglycerin fatty acid ester, polyoxyethylene alkylphenyl ether, ethyl cellulose, ethylhydroxycellulose, polyethylene oxide, anhydrous polyethylene maleate, anhydrous polybutadiene maleate, anhydrous ethylene maleate-propylene-diene terpolymer, copolymer of α-olefin and maleic anhydride or a derivative thereof, and polyoxyethylene alkylether phosphate.

The amount of the emulsifier used is generally in the range of 0.05 to 10% by weight, preferably 0.1 to 1% by weight relative to the hydrophobic solvent.

(3) Hydrophobic Solvent

In the present invention, any desired hydrophobic solvent can be used with the proviso that it is basically hardly soluble in water, and inert with respect to polymerization. Exemplary solvents are aliphatic hydrocarbons such as n-pentane, n-hexane, n-heptane, and n-octane; alicyclic hydrocarbons such as cyclohexane, and methylcyclohexane; and aromatic hydrocarbons such as benzene, toluene, and xylenes. Preferable among these are n-hexane, n-heptane, and cyclohexane from the viewpoint of quality and commercial availability.

The amount of the hydrophobic solvent used is generally 0.5 to 10 times by weight, preferably 0.6 to 5 times by weight the aqueous solution of the water-soluble ethylenically unsaturated monomer used for the first-stage polymerization.

(4) Crosslinking Agent

In the present invention, a crosslinking agent may optionally be used both at the first and second polymerization stages according to necessity. A crosslinking agent may be dispensed with if the monomer per se undergoes so-called self-crosslinking even in the absence of any crosslinking agent, although this depends on monomer conditions (e.g., the type of monomer, the concentration of monomer in the aqueous solution, and the degree of neutralization of monomer). In some cases, however, the use of a crosslinking agent is needed to meet the desired performance, e.g., water absorption capacity, and the speed of water absorption. The crosslinking agent used herein should contain at least two polymerizable unsaturated groups and/or reactive functional groups per molecule.

Exemplary crosslinking agents containing at least two polymerizable unsaturated groups per molecule are di- or tri-(meth)acrylic esters of polyols such as ethylene glycol, propylene glycol, trimethylolpropane, glycerin polyoxyethylene glycol, polyoxypropylene glycol, and polyglycerin; unsaturated polyesters obtained by reactions between the aforesaid polyols and unsaturated acids such as maleic acid, and fumaric acid; bisacrylamides such as N,N'-methylenebisacrylamide; di- or tri-(meth)acrylic esters obtained by reactions between polyepoxides and (meth) acrylic acids; carbamyl (meth)acrylates obtained by reactions between polyisocyanates such as tolylene diisocyanate and hexamethylene diisocyanate and hydroxyethyl (meth) acrylate; and polyhydric allyls such as allylated starch, allylated cellulose, diallyl phthalate, tetraallyloxyethane, pentaerythritol allyl ether, trimethylolpropane triallyl ether, diethylene glycol diallyl ether, and triallyl trimerllitate. Among these crosslinking agents, ethylene glycol di(meth) acrylate, polyethylene glycol di(meth)acrylate, propylene glycol di(meth)acrylate, polypropylene glycol di(meth) acrylate, and N,N'-methylenebis(meth)acrylamide are preferred.

Exemplary crosslinking agents containing at least two reactive functional groups per molecule are diglycidyl ether compounds, haloepoxy compounds, and isocyanate compounds, the diglycidyl ether compounds being particularly preferred. Exemplary diglycidyl ether compounds are ethylene glycol diglycidyl ether, polyethylene glycol diglycidyl ether, propylene glycol diglycidyl ether, polypropylene glycol diglycidyl ether, glycerin diglycidyl ether, and polyglycerin diglycidyl ether, the ethylene glycol diglycidyl ether being particularly preferred. The haloepoxy compounds usable herein are exemplified by epichlorohydrin, epibromohydrin, and β-methylepichlorohydrin, and the isocyanate compounds usable herein 2,4-tollylene diisocyanate, and hexamethylene diisocyanate.

The amount of the crosslinking agent used is usually in the range of 0 to 10% by weight, preferably 0.001 to 5% by weight relative to the ethylenically unsaturated monomer.

(5) Water-Soluble Radical Polymerization Initiator

The polymerization initiator usable herein is a water-soluble radical polymerization initiator exemplified by hydrogen peroxide; persulfates such as potassium persulfate, sodium persulfate, and ammonium persulfate; and azo compounds such as 2,2'-azobis-(2-aminodipropane) dihydrochloride, 2,2'-azobis-(N,N'-dimethyleneisobutylamidine) dihydrochloride, and 2,2'-azobis{2-methyl-N-[1,1-bis(hydroxymethyl)-2-hydroxy-eth yl]propionamide}. These water-soluble radical initiators may be used in admixture. Hydrogen peroxide, and the persulfate may be used in the form of a redox type of initiator in combination with reducing substances such as persulfides and L-ascorbic acid, or amines. The amount of the polymerization initiator or initiators used is generally in the range of 0.001 to 5% by weight, preferably 0.01 to 1% by weight relative to the ethylenically unsaturated monomer.

(6) Surface Active Agent

In the present invention, when the first-stage reverse-phase suspension polymerization has substantially been completed, i.e. at the polymerization degree of generally at least 90%, preferably at least 95%, the second aqueous monomer solution is added to the resulting slurry system containing hydrous polymer gel particles so that the aqueous solution is absorbed in the hydrous polymer gel particles. Upon the absorption of the aqueous monomer solution in the polymer gel particles, a specific surface active agent is allowed to exist in the slurry system. The surface active agent usable herein is a nonionic or anionic surface active agent having an HLB of at least 7, preferably 9 to 17, most preferably 9 to 12, and higher than that of the aforesaid emulsifier. The HLB of the surface active agent is preferably higher than that of the emulsifier by at least 1.

Exemplary nonionic surface active agents are polyoxyethylene alkylphenyl ether, polyoxyethylene alkyl ether, polyoxyethylene fatty acid ester, polyoxyethylene alkylphenyl ether, polyoxyethylene-polyoxypropylene block polymer, sorbitan fatty acid ester, polyoxyethylene sorbitan fatty acid ester, polyoxyethylene alkylamine ether, fatty acid diethanolamide, sucrose fatty acid ester, and poly-glycerin fatty acid ester.

Exemplary anionic surface active agents are fatty acid salts such as soda oleate, castor oil potassium, and semi-cured tallow soda; sodium lauryl sulfate; higher alcohol sulfate esters such as higher alcohol sulfate soda salt, lauryl alcohol sulfate ester.triethanolamine salt, and lauryl alcohol sulfate ammonium salt; alkylbenzene sulfonates and alkyl-naphthalene sulfonates such as soda dodecylbenzene sulfonate and soda alkylnaphthalene sulfonate; naphthalene-sulfonic acid.formalin condensate; dialkylsulfosuccinates such as sodium dialkylsulfosuccinate; (di)alkyl phosphate salts; polyoxyethylene sulfate salts such as polyoxyethylene alkyl sulfate soda, and polyoxyethylene alkylphenyl sulfate soda; polyoxyethylene polyoxypropylene glycol ether sulfate ammonium salt; polyoxyethylene distyrenated phenyl ether sulfate ammonium salt; and other high-molecular special anions. These surface active agents can be used singly or as a mixture of two or more.

Among the aforesaid surface active agents preference is given to at least one member selected from polyoxyethylene alkylphenyl ether, polyoxyethylene-polyoxypropylene block polymer, and alkylbenzene sulfonate, or a mixture of two or more.

The amount of the surface active agent or agents used is generally in the range of 0.05 to 10% by weight, preferably 0.1 to 5% by weight relative to the final water-absorbing resin after the second-stage polymerization, although it varies depending on the monomer species used, operating conditions, or the like.

PROCESSES OF, AND CONDITIONS FOR, POLYMERIZATION REACTIONS

20 According to the present invention, the aqueous solution of the water-soluble ethylenically unsaturated monomer is first subjected to the first-stage reverse-phase suspension polymerization in the hydrophobic solvent in the presence of the W/O type of emulsifier and, if required, in the presence of the crosslinking agent, using the water-soluble radical initiator. Although varying depending on the polymerization conditions applied, such as the type of the emulsifier used, a slurry mixture comprising hydrous polymer gel particles (seed particles) having an average particle diameter of generally about 10 to 300 μm, the emulsifier in excess and the hydrophobic solvent is formed after the first-stage polymerization. In this case, the polymerization may be carried out either by a batch process wherein a batch of the aqueous monomer solution is charged in a reactor or by a dropwise process wherein the aqueous. monomer solution is added dropwise to the hydrophobic solvent. The slurry is then held at a temperature equal to, or lower than, the first-stage polymerization temperature. Subsequently, the aqueous solution of the second water-soluble ethylenically unsaturated monomer is added to the slurry so as to allow the aqueous monomer solution to be absorbed in the hydrous polymer gel particles in the presence of the aforesaid specific surface active agent.

The water-soluble ethylenically unsaturated monomer for use at the second polymerization stage may be identical with, or different from, that used at the first polymerization stage. For instance, quite different monomer species may be used; an aqueous solution of sodium acrylate may be used for the first-stage polymerization, and an aqueous solution of acrylamide for the second-stage polymerization. Alternatively, the same monomer species, for instance, an aqueous solution of sodium acrylate, may be used at such conditions that the first polymerization stage and the second polymerization stage are carried out at different degrees of neutralization or different monomer concentrations. The amount of the second aqueous monomer solution is generally in the range of 5 to 300% by weight, preferably 10 to 150% by weight of the first aqueous monomer solution. The addition of a crosslinking agent and a water-soluble radical polymerization initiator to the slurry for the second-stage polymerization is not an essential requirement, and may optionally be carried out depending on the desired product quality. The second polymerization can easily proceed even in the absence of any fresh water-soluble radical polymerization initiator, once the slurry with the pre-added polymerization initiator absorbed therein is brought to the polymerization temperature. The addition of the second water-soluble ethylenically unsaturated monomer should preferably be carried out such that the temperature of the mixture after the absorption treatment be equal to, or lower than, the decomposition temperature of the radical polymerization initiator.

The surface active agent may be added to the slurry before, simultaneously with or after, the addition of the second aqueous monomer. The surface active agent may be added directly, or as an aqueous solution, or by dissolving in or intimately mixing with the second monomer solution or the hydrophobic solvent. However, it is preferred that the surface active agent be dissolved in or intimately mixed with the second aqueous monomer solution.

Preferably, the slurry is adjusted at a temperature at which almost all of the W/O type of emulsifier remaining in the slurry is dissoluble in the hydrophobic solvent. On the other hand, it is preferable that the temperature of the second aqueous monomer solution be generally at around room temperature, i.e., 15° to 40° C., although varying depending on whether or not the radical polymerization initiator is present in the aqueous solution, the type of the radical polymerization initiator, if used, or the like.

The absorption of the second aqueous monomer solution in the seed particles at the second polymerization stage takes place rapidly in the presence of the specific surface active agent as mentioned above, and the slurry system becomes viscous. It is then important that the absorption of the second monomer in the seed polymer be effected as uniformly as possible. Generally, the gel particles with the monomer absorbed therein is somewhat sticky, and liable to agglomerate. Therefore, when the absorption of the monomer in the seed polymer is uneven, the gel particles agglomerate locally into large lumps which in turn settle down or stagnate, producing large influences on the average particle diameter and size distribution of the resulting granulated product as well as on the stability of continuous production. Uniform absorption is affected by various factors, among which temperature, stirring intensity, and monomer feed rate are important as well as the type and concentration of the surface active agent used. The higher the stirring intensity and the lower the monomer feed rate, the more uniform the absorption of the monomer. In one exemplary way suitable for making the absorption of the monomer uniform, the revolutions per minute (rpm) of a stirrer is first set at a value higher than the lower limit of rpm above which the absorption of the monomer cannot occur, and then the rpm is gradually lowered. At such high-enough revolutions per minute, the suspension (slurry) system remains in the W/O type state even upon the addition of the aqueous monomer solution. The aqueous monomer solution for the second-stage polymerization is thus kept from being absorbed in the seed polymer in that state of system, and the system may become a completely uniformly mixed state. Thereafter, the rpm is gradually decreased to promote the absorption of the monomer, so that the aqueous monomer solution can uniformly be absorbed in the seed particles (hydrous polymer gel particles).

In this way, gel particles with the aqueous monomer solution uniformly absorbed therein can be obtained. The gel particles are liable to agglomerate as already mentioned. Therefore, the rpm of a stirrer during and after the absorption of the monomer solution is an important factor in the determination of the average particle size of a granulated product. The higher the rpm, the smaller the average particle size of the product.

The second polymerization is initiated by, for example, heating the slurry system, and with the progress of the polymerization, the gel particles begin to agglomerate and finally take a grape-like form. The rpm of a stirrer during the second polymerization also is an important factor in the determination of the average particle size of the final granulated product. The higher the rpm, the smaller the average particle size.

If desired, the procedure of the addition of the second monomer solution to the system so as to effect the monomer absorption and the subsequent polymerization can be repeated at least one time, preferably two to four times.

The thus formed polymer slurry is subjected to direct dehydration or azeotropic dehydration with the hydrophobic solvent, and the resulting polymer may optionally be surface-treated, followed by drying, sieving, etc. to give a final article.

EXAMPLES

The following examples are provided merely to illustrate the present invention and should not be construed as limiting thereof in any way.

The water absorption capacity, speed of water absorption, particle size distribution/average particle diameter, and cohesion strength of the water-absorbing resins described in these examples were measured in the following manners.

(1) Water Absorption Capacity

Precisely weighed about 0.5 gram of water-absorbing resin was put in a 250-mesh nylon bag (of 20 cm×10 cm in dimension) and the bag was immersed in 500 cc of an artificial urine. Thereafter, the nylon bag was pulled up, stripped of water for 15 minutes and weighed. After making blank correction, the water absorption capacity of the resin was calculated from the following equation:

$$\text{Water Absorption Capacity} = \frac{\text{Weight of Water-Swollen Gel (g)}}{\text{Weight of Feed Polymer (g)}}$$

The artificial urine used had the following composition:

| Composition of Artificial Urine | |
|---|---|
| Urea | 1.94% |
| Sodium chloride | 0.80% |
| Calcium chloride | 0.06% |
| Magnesium sulfate | 0.11% |
| Pure water | 97.09% |

(2) Speed of Water Absorption

Two (2) grams of water-absorbing resin were placed in a 100 ml beaker which was previously charged with 50 ml of a 0.9% by weight physiologic saline while a rotor (of 33 mm in length) was rotated therein by a magnetic stirrer, and the period of time from the addition of the resin till the stop of rotation of the rotor was measured. The measured time is herein defined as the speed of water absorption.

(3) Average Particle Diameter/Particle Size Distribution

An ASTM standard sieve device was constructed from, in order from above, 8-mesh, 12-mesh, 20-mesh, 40-mesh, 60-mesh, 80-mesh, 100-mesh, 150-mesh, 200-mesh, and 325-mesh sieves with a receiver pan. About 50 grams of water-absorbing resin were placed on the topmost sieve, and then shaken for 1 minute using a Ro-Tap type of automatic shaker. The weight of the water-absorbing resin remaining on each sieve was measured, and the percentage thereof relative to the overall weight of the water-absorbing resin was calculated on mass basis.

(4) Cohesion Strength 0.5 gram of water-absorbing resin passing through a 20-mesh sieve but not through an 80-mesh sieve was uniformly scattered over a central area of 8 cm×8 cm of a SUS plate of 10 cm×10 cm. Then, another SUS plate was put on the aforesaid plate with the water-absorbing resin sandwiched between them, followed by a 10-minute application of a pressure of 130 kgf/cm$^2$. After de-pressurization, the water-absorbing resin was removed from between the plates for a 1-minute shaking using the aforesaid Ro-Tap type of automatic shaker. The amount of the resin passing through an 80-mesh sieve was measured to determine the percentage by weight thereof. (The smaller the found value, the lesser the disintegration of the granulated particles or the higher the cohesion strength.)

Example 1

317 grams of cyclohexane were placed in a four-necked round flask of 1 liter in volume, with a stirrer, a reflux condenser, a thermometer and a nitrogen gas inlet tube provided thereto, and 1.587 grams of sorbitan monostearate with HLB=4.7 were added and dissolved therein, while the internal temperature thereof was maintained at 20° C. under a nitrogen gas atmosphere. While cooled from the outside, 55.7 grams of water were added to 116.2 grams of acrylic acid placed in another conical flask of 500 cc in volume, and 180.6 grams of a 25% caustic soda were further added thereto for neutralization of 70% of the carboxyl group. In this case, the concentration of the monomer with respect to water corresponds to 40% by weight upon neutralized. Then, 0.0935 grams of N,N-methylenebis-acrylamide, 0.1208 grams of potassium persulfate, and 0.1104 grams of sodium hypophosphite hydrate as a water-soluble chain transfer agent were added and dissolved in the content of the conical flask, while the temperature was kept at 20° C.

Added to the content of the aforesaid four-necked round flask of 1 liter in volume were 176.3 grams of the content of the conical flask of 500 cc in volume for suspension under agitation. It is here to be noted that stirring was carried out at 150 rpm using a full-zone blade. Then, the suspension was heated at the same rpm to around 55° C. at which polymerization started and reached a peak at around 77° C. The polymerization system was subsequently held at 70° C. for 15 minutes. After the 15-minute reaction, the polymerized content was cooled down to 50° C.

Next, 1.8 grams of polyoxyethylene-polyoxypropylene block polymer as a surface active agent (HLB=10.1; "PEPOL B184" made by Toho Chemical Industry Co., Ltd.) were added and dissolved in the remaining portion (about 176.3 grams) of the aqueous solution of monomer contained in the aforesaid 500 cc flask. The resulting monomer solution was then added to the aforesaid polymerized content at 20° C. and 200 rpm. After the addition, the temperature of the content was found to be about 40° C., at which the system resembled a somewhat viscous slurry. After the completion of the monomer addition, the monomer solution was almost completely absorbed in the hydrous polymer gel particles obtained at the first polymerization stage. Then, the slurry was heated to about 55° C. with stirring at 500 rpm, at which polymerization started and reached a peak at around 69° C. After held at 70° C. for a further 15 minutes, the system was further heated at the same rpm to dehydrate the resulting polymer to 7% by weight of water content by azeotropy with cyclohexane.

Upon stirring stopped after the completion of dehydration, polymer particles settled down on the bottom of the flask, so that they could easily be separated by decantation. The separated polymer was heated at 90° C. to remove cyclohexane depositions and some water therefrom. The thus obtained polymer was found to be a free-flowing powdery granulated product with primary particles bound together in a grape form.

Example 2

A powdery granulated product was obtained by the same operation and procedure as in Example 1 with the exception that 1.8 grams of a polyoxyethylene-polyoxypropylene block polymer (HLB=17; "EPAN 485" made by DAI-ICHI KOGYO SEIYAKU CO., LTD.) were used as the surface active agent.

Example 3

A powdery granulated product was obtained by the same operation and procedure as in Example 1 with the exception that polyoxyethylene nonylphenyl ether (HLB=17; "NOIGEN EA170" made by DAI-ICHI KOGYO SEIYAKU CO., LTD.) was used as the surface active agent.

Example 4

A powdery granulated product was obtained by the same operation and procedure as in Example 1 except that triethanolamine dodecylbenzene sulfonate (an anionic surface active agent; "NEOGEN T" made by DAI-ICHI KOGYO SEIYAKU CO., LTD.) was used as the surface active agent.

Example 5

317 grams of cyclohexane were placed in a four-necked round flask of 1 liter in volume, with a stirrer, a reflux condenser, a thermometer and a nitrogen gas inlet tube provided thereto, and 1.587 grams of sorbitan monostearate with HLB=4.7 were added and dissolved therein, while the internal temperature thereof was maintained at 20° C. under a nitrogen gas atmosphere. While cooled externally, 55.7 grams of water were added to 116.2 grams of acrylic acid placed in another conical flask of 500 cc in volume, and 180.6 grams of a 25% caustic soda were further added thereto for neutralization of 70% of the carboxyl group. In this case, the concentration of the monomer with respect to water corresponds to 40% by weight upon neutralized. Then, 0.0935 grams of N,N-methylenebis-acrylamide, 0.1208 grams of potassium persulfate, and 0.1104 grams of sodium hypophosphite hydrate as a water-soluble chain transfer agent were added and dissolved in the content of the conical flask, while the temperature was kept at 20° C.

Added to the content of the aforesaid four-necked round flask of 1 liter in volume was the content of the 500 cc conical flask for suspension under agitation. It is here to be noted that stirring was carried out at 150 rpm using a full-zone blade.

Then, the suspension was heated at the same rpm to around 55° C. at which polymerization started and reached a peak at around 77° C. The polymerization system was subsequently held at 70° C. for 15 minutes. After the 15-minute reaction, the polymerized content was cooled down to 52° C.

Next, the same aqueous monomer solution as in the aforesaid 500 cc flask was prepared in an amount of 352.5 grams, and 0.781 grams of polyoxyethylene nonylphenyl ether as a surface active agent (HLB=12; "NOIGEN EA120" made by DAI-ICHI KOGYO SEIYAKU CO., LTD.) were added and dissolved therein. The resulting monomer solution was then added to the aforesaid polymerized content at 20° C. and 150 rpm. After the addition, the temperature of the content was found to be 40° C., at which the system resembled a somewhat viscous slurry. After the completion of the addition, the monomer solution was almost completely absorbed in the hydrous polymer gel particles obtained at the first polymerization stage. Then, the slurry was heated to about 55° C. with stirring at 500 rpm, at which polymerization started and reached a peak at around 69° C. After held at 70° C. for a further 15 minutes, the system was further heated at the same rpm to dehydrate the resulting polymer to 7% by weight of water content by azeotropy with cyclohexane.

Upon stirring stopped after the completion of dehydration, polymer particles settled down on the bottom of the flask, so that they could easily be separated by decantation. The separated polymer was heated at 90° C. to remove cyclohexane depositions and some water therefrom. The thus obtained polymer was found to be a free-flowing powdery granulated product with primary particles bound together in a grape form.

Example 6

A powdery granulated product was obtained by the same operation and procedure as in Example 5 with the exception that 2.6 grams of sodium polyoxyethylene octyl acetate (an anionic surface active agent; "NIKKOL ECTD-3NEX" made by Nikko Chemicals Co., Ltd.) were used as the surface active agent.

Example 7

A powdery granulated product was obtained by the same operation and procedure as in Example 5 with the exception that 0.39 grams of dovanol polyoxyethylene sulfate ammonium salt (an anionic surface active agent; "HITENOL 12" made by DAI-ICHI KOGYO SEIYAKU CO., LTD.) were used as the surface active agent.

Example 8

A powdery granulated product was obtained by the same operation and procedure as in Example 5 with the exception that 1.8 grams of triethanolamine dodecylbenzene sulfonate (an anionic surface active agent; "NEOGEN T" made by DAI-ICHI KOGYO SEIYAKU CO., LTD.) and 0.45 grams of a polyoxyethylene-polyoxypropylene block polymer (HLB=10.1; "PEPOL B184" made by Toho Chemical Industry Co., Ltd.) were used as the surface active agent, the amount of the absorbing monomer was 176.3 grams, and absorption was carried out at 400 rpm.

Example 9

A powdery granulated product was obtained by the same operation and procedure as in Example 5 with the exception that 1.8 grams of triethanolamine dodecylbenzene sulfonate (an anionic surface active agent; "NEOGEN T" made by DAI-ICHI KOGYO SEIYAKU CO., LTD.) and 0.45 grams of a polyoxyethylene-polyoxypropylene block polymer (HLB=17; "EPAN 485" made by DAI-ICHI KOGYO SEIYAKU CO., LTD.) were used as the surface active agent, the amount of the absorbing monomer was 176.3 grams, and absorption was carried out at 400 rpm.

Example 10

A powdery granulated product was obtained by the same operation and procedure as in Example 5 with the exception that 5.99 grams of triethanolamine dodecylbenzene sulfonate (an anionic surface active agent; "NEOGEN T" made by DAI-ICHI KOGYO SEIYAKU CO., LTD.) and 1.52 grams of a polyoxyethylene-polyoxypropylene block polymer (HLB=10.1; "PEPOL B184" made by Toho Chemical Industry Co., Ltd.) were used as the surface active agent, the amount of the absorbing monomer was 123.4 grams, and absorption was carried out at 400 rpm.

Example 11

A powdery granulated product was obtained by the same operation and procedure as in Example 5 with the exception that 2.38 grams of triethanolamine dodecylbenzene sulfonate (an anionic surface active agent; "NEOGEN T" made by DAI-ICHI KOGYO SEIYAKU CO., LTD.) and 0.54 grams of a polyoxyethylene-polyoxypropylene block polymer (HLB=10.1; "PEPOL B184" made by Toho Chemical Industry Co., Ltd.) were used as the surface active agent, the amount of the absorbing monomer was 44.1 grams, and absorption was carried out at 300 rpm.

Example 12

A powdery granulated product was obtained by the same operation and procedure as in Example 5 with the exception that the emulsifier used for the first-stage polymerization was changed from 1.587 grams of sorbitan monostearate to a mixture consisting of 0.537 grams of a $C_{28-38}$ alkene ("DAIYAKARUNA D30" made by Mitsubishi Chemicals Co., Ltd.), 0.581 grams of a copolymer of said $C_{28-38}$ alkene with maleic anhydride and 1.117 grams of sorbitan monostearate, the first-stage polymerization was carried out at 180 rpm, 1.8 grams of triethanolamine dodecylbenzene sulfonate (an anionic surface active agent; "NEOGEN T" made by DAI-ICHI KOGYO SEIYAKU CO., LTD.) and 0.45 grams of a polyoxyethylene-polyoxypropylene block polymer (HLB=10.1; "PEPOL B184" made by Toho Chemical Industry Co., Ltd.) were used as the surface active agent, the amount of the absorbing monomer was 176.3 grams, and absorption was carried out at 400 rpm.

Example 13

325.4 grams of cyclohexane were placed in a four-necked round flask of 1 liter in volume, with a stirrer, a reflux condenser, a thermometer and a nitrogen gas inlet tube provided thereto, and 1.627 grams of sorbitan monostearate with HLB=4.7 were added and dissolved therein, while the internal temperature thereof was maintained at 20° C. under a nitrogen gas atmosphere. While cooled from the outside, 38.74 grams of water were added to 116.2 grams of acrylic acid placed in another conical flask of 500 cc in volume, and 206.6 grams of a 25% caustic soda were further added thereto for neutralization of 80% of the carboxyl group. In this case, the concentration of the monomer with respect to water corresponds to 40% by weight upon neutralized. Then, 0.0935 grams of N,N-methylenebisacrylamide, 0.1208 grams of potassium persulfate, and 0.1104 grams of sodium hypophosphite hydrate as a water-soluble chain transfer agent were added and dissolved in the content of the conical flask, while the temperature was kept at 20° C. the temperature was kept at 20° C.

Added to the content of the aforesaid four-necked round flask of 1 liter in volume was the content of the conical flask of 500 cc in volume for suspension under agitation. It is here to be noted that stirring was carried out at 180 rpm using a full-zone blade.

Then, the suspension was heated at the same rpm to around 56° C. at which polymerization started and reached a peak at around 78° C. The polymerization system was subsequently held at 70° C. for 15 minutes. After the 15-minute reaction, the polymerized content was cooled down to 52° C.

While cooled from the outside, 38.74 grams of water were added to 151.1 grams of acrylic acid placed in still another conical flask of 500 cc in volume, and 206.6 grams of a 25% caustic soda were further added thereto for neutralization of 61.5% of the carboxyl group. In this case, the concentration of the monomer with respect to water corresponds to 45.2% by weight upon neutralized. Then, 0.0935 grams of N,N-methylenebisacrylamide, 0.1208 grams of potassium persulfate, and 0.1104 grams of sodium hypophosphite hydrate as a water-soluble chain transfer agent were added and dissolved in the content of the conical flask, while the temperature was kept at 20° C. Added and dissolved in 319.4 grams of this aqueous monomer solution were 0.801 grams of polyoxyethylene nonylphenyl ether as a surface active agent (HLB=12; "NEOGEN EA120" made by DAI-ICHI KOGYO SEIYAKU CO., LTD.), and the resulting solution was added to the aforesaid polymerized content at 150 rpm. After the addition, the temperature of the content was found to be about 40° C., at which the system resembled a somewhat viscous slurry. After the completion of the monomer addition, the monomer solution was almost completely absorbed into the hydrous polymer gel particles obtained at the first polymerization stage. Then, the slurry was heated to about 55° C. with stirring at 500 rpm, at which polymerization started and reached a peak at around 69° C. After held at 70° C. for a further 15 minutes, the system was further heated at the same rpm to dehydrate the resulting polymer to 7% by weight of water content by azeotropy with cyclohexane.

Upon stirring stopped after the completion of dehydration, polymer particles settled down on the bottom of the flask, so that they could easily be separated by decantation. The separated polymer was heated at 90° C. to remove cyclohexane depositions and some water therefrom. The thus obtained polymer was found to be a free-flowing powdery granulated product with primary particles bound together in a grape form.

Example 14

A powdery granulated product was obtained by the same operation and procedure as in Example 13 with the exception that an aqueous solution of the absorbing monomer was 240.0 grams, 3.8 grams of triethanolamine dodecylbenzene sulfonate (an anionic surface active agent; "NEOGEN T" made by DAI-ICHI KOGYO SEIYAKU CO., LTD.) and 0.86 grams of a polyoxyethylene-polyoxypropylene block polymer (HLB=10.1; "PEPOL B184" made by Toho Chemical Industry Co., Ltd.) were used as the surface active agent, and absorption was carried out at 500 rpm.

Comparative Example 1

Polymerization and dehydration were carried out by the same operation and procedure as in Example 5 with the exception that no surface active agent was added to the second monomer solution. The obtained dry polymer was found to be a single particle form of powdery polymer containing a considerable amount of fine powder.

Comparative Example 2

Confirmative testing was performed following the technique disclosed in JP-A-3-227301. That is, 317 grams of cyclohexane were placed in a four-necked round flask of 1 liter in volume, with a stirrer, a reflux condenser, a thermometer and a nitrogen gas inlet tube provided thereto, and 1.587 grams of sorbitan monostearate with HLB=4.7 temperature thereof was maintained at 20° C. under a nitrogen gas atmosphere. While cooled from the outside, 55.7 grams of water were added to 116.2 grams of acrylic acid placed in another conical flask of 500 cc in volume, and 180.6 grams of a 25% caustic soda were further added thereto for neutralization of 70% of the carboxyl group. In this case, the concentration of the monomer with respect to water corresponds to 40% by weight upon neutralized. Then, 0.0935 grams of N,N-methylenebis-acrylamide, 0.1208 grams of potassium persulfate, and 0.1104 grams of sodium hypophosphite hydrate as a water-soluble chain transfer agent were added and dissolved in the content of the conical flask, while the temperature was kept at 20° C.

Added to the content of the aforesaid four-necked round flask of 1 liter in volume was about a half (176.3 grams) of the content of the conical flask of 500 cc in volume for suspension under agitation. It is here to be noted that stirring was carried out at 150 rpm using a full-zone blade. Then, the suspension was heated at the same rpm to around 55° C. at which polymerization started and reached a peak at around 77° C. The polymerization system was subsequently held at 70° C. for 15 minutes. After the 15-minute reaction, the polymerized content was cooled down to 20° C. to precipitate sorbitan monostearate as an emulsifier.

Then, another half (about 176.3 grams) of the content in the aforesaid 500 cc flask was added to the aforesaid polymerized content at 20° C. and 50 rpm, followed by a 1-hour holding at that temperature.

Then, the slurry was heated to about 55° C. with stirring at 150 rpm, at which polymerization started and reached a peak at around 69° C. After held at 70° C. for a further 15 minutes, the system was further heated at the same rpm to dehydrate the resulting polymer to 7% by weight of water content by azeotropy with cyclohexane.

Upon stirring stopped after the completion of dehydration, polymer particles settled down on the bottom of the flask, so that they could easily be separated by dehydration, polymer particles settled down on the bottom of the flask, so that they could easily be separated by decantation. The separated polymer was heated at 90° C. to remove cyclohexane depositions and some water therefrom, thereby obtaining a powdery polymer.

Comparative Example 3

A powdery polymer was obtained by the same operation and procedure as in Comparative Example 2 except that the first-stage polymerization was carried out at 170 rpm, and both the temperature of the polymerized content and the temperature of the aqueous solution of the second monomer were 13° C.

Comparative Example 4

Confirmative testing was performed following the technique disclosed in JP-A-3-227301. That is, 376.27 grams of n-heptane were placed in a four-necked round flask of 1 liter in volume, with a stirrer, a reflux condenser, a thermometer and a nitrogen gas inlet tube provided thereto, and 1.38 grams of sucrose fatty acid ester with HLB=3 ("Ryoto Sugar Ester S-370 made by Mitsubishi-Kagaku Foods Co., Ltd.) were added and heated to 50° C. for dissolution therein, while the internal temperature thereof was maintained at 30° C. under a nitrogen gas atmosphere. While cooled from the outside, 21.3 grams of water were added to 80.6 grams of acrylic acid placed in another conical flask of 500 cc in volume, and 179.1 grams of a 25% caustic soda were further added thereto for neutralization of 70% of the carboxyl group. In this case, the concentration of the monomer with respect to water corresponds to 40% by weight upon neutralized. Then, 0.059 grams of N,N-methylenebis-acrylamide, 0.0765 grams of potassium persulfate, and 0.069 grams of sodium hypophosphite hydrate as a water-soluble chain transfer agent were added and dissolved in the content of the conical flask, while the temperature was kept at 20° C.

Added to the content of the aforesaid four-necked round flask of 1 liter in volume was the content of the rpm using a full-zone blade. Then, the suspension was heated at the same rpm to around 68° C. at which polymerization started and reached a peak at around 84° C. The polymerization system was subsequently held at 70° C. for 1 hour, thereby ending the polymerization.

Next, the polymerized content was cooled down to 20° C. to precipitate the emulsifier.

Then, 281.2 grams of the same aqueous monomer solution as used for the first-stage polymerzation were prepared, and added to the aforesaid polymerized content at 20° C. and 150 rpm, followed by a 30-minute holding at that temperature. The aqueous monomer solution added was almost completely absorbed in the polymerized content. Then, the slurry was heated to about 67° C. with stirring at 500 rpm, at which polymerization started and reached a peak at around 75° C. After held at 70° C. for a further 1 hour, the system was further heated at the same rpm to dehydrate the resulting polymer to 7% by weight of water content by azeotropy with n-heptane.

Upon stirring stopped after the completion of dehydration, polymer particles settled down on the bottom of the flask, so that they could easily be separated by decantation. The separated polymer was heated at 90° C. to remove n-heptane depositions and some water therefrom, thereby obtaining a powdery polymer.

The polymers obtained in Examples 1–14 and Comparative Examples 1–4 were estimated for their average particle diameter, particle size distribution, and cohesion strength. The results are reported in Table 1.

Example 15

The powdery Granulated product obtained in Example 10 was regulated to a water content of 20% by weight, and 1,000 ppm of γ-glycidoxypropyltri-methoxysilane as a surface treating agent were added to the dried water-absorbing resin for surface crosslinking. After drying, a powdery granulated product was obtained.

Comparative Examples 5 & 6

In these examples, commercially available granulated products obtained by reverse-phase suspension polymerization, AP-200N (made by The Nippon Synthetic Chemical Industry Co., Ltd.) and SA60 (made by Sumitomo Seika Chemicals Company, Limited) were used respectively.

The polymers according to Example 15 and Comparative Examples 5 & 6 were estimated for their water absorption capacity and speed of water absorption. The results are reported in Table 2.

As can be understood from Examples 1–14 and Comparative Examples 1–4 (Table 1) of the present invention, the use of a specific surface active agent enables the aqueous monomer solution used at the second-polymerization stage to be absorbed in the hydrous polymer gel particles with extremely increased efficiency. The obtained granulated product has great strength and a narrow particle size distribution, and contains little, if any, fine powder component (that passes through #80).

As can be evident form Example 15 and Comparative Examples 5 & 6, the granulated product of the water-absorbing resin obtained according to the present invention can absorb water at a particularly high speed.

TABLE 1

|  | Mean Particle diameter (μm) | Particle Size Distribution (wt. %) | | | Cohesion Strength (wt. %) |
| --- | --- | --- | --- | --- | --- |
|  |  | ≥ #20 | #20 pass –#80 on | <#80 |  |
| Ex. 1 | 1015 | 58.8 | 40.3 | 0.9 | 2.5 |
| 2 | 1300 | 73.5 | 26.5 | 0.0 | 3.4 |
| 3 | 700 | 37.8 | 58.7 | 3.5 | 3.8 |
| 4 | 670 | 34.4 | 63.8 | 1.8 | 4.0 |
| 5 | 590 | 30.4 | 64.4 | 5.2 | 8.2 |
| 6 | 450 | 16.6 | 77.4 | 6.0 | 4.2 |
| 7 | 705 | 41.6 | 55.8 | 2.6 | 7.2 |
| 8 | 500 | 20.4 | 76.8 | 2.8 | 4.6 |
| 9 | 420 | 7.9 | 88.6 | 3.5 | 7.3 |
| 10 | 335 | 23.0 | 70.1 | 6.9 | 5.8 |
| 11 | 620 | 33.2 | 64.2 | 2.6 | 3.9 |
| 12 | 705 | 45.2 | 51.6 | 3.3 | 4.5 |
| 13 | 370 | 0.8 | 93.2 | 6.0 | 6.8 |
| 14 | 770 | 46.2 | 53.2 | 0.6 | 2.1 |
| Comp. Ex. 1 | No granulation | | | | |
| 2 | 185 | 2.2 | 48.2 | 49.6 | 15.1 |
| 3 | 260 | 12.9 | 66.7 | 20.4 | 12.2 |
| 4 | 160 | 4.1 | 36.1 | 59.8 | 10.3 |

TABLE 2

|  | Water Absorption Capacity (g/g) | Speed of Water Absorption (sec) |
| --- | --- | --- |
| Ex. 15 | 50 | 28 |
| Comp. Ex. 5 | 46 | 40 |
| 6 | 50 | 42 |

What we claim is:

1. A method of preparing a water-soluble resin, which comprises the steps of:

subjecting an aqueous solution of a first water-soluble ethylenically unsaturated monomer to a first-stage water-in-oil type of reverse-phase suspension polymerization using a water-soluble radical polymerization initiator in a hydrophobic organic solvent in the presence of an emulsifier and optionally a crosslinking agent, thereby forming a slurry containing hydrous polymer gel particles;

adding to said slurry a nonionic or anionic surface active agent having an HLB of at least 7 and higher than that of said emulsifier and an aqueous solution of a second water-soluble ethylenically unsaturated monomer so as to absorb the aqueous solution of the second monomer in said hydrous polymer gel particles; and carrying out a second-stage polymerization of said second monomer.

2. The method according to claim 1, wherein the addition of the second monomer solution and the second-stage polymerization are repeated at least one time.

3. The method according to claim 1 or 2, wherein the temperature of the aqueous solution of the second monomer which has just been absorbed in the polymer gel particles is lower than the decomposition temperature of the water-soluble radical polymerization initiator.

4. The method according to claim 1 or 2, wherein the surface active agent is added to said slurry in such a manner that it is previously dissolved in or intimately mixed with the aqueous solution of the second monomer.

5. The method according to claim 1 or 2, wherein the amount of the second monomer used is 5 to 300% by weight of the first monomer.

6. The method according to claim 1 or 2, wherein the water-soluble ethylenically unsaturated monomer is at least one monomer selected from the group consisting of acrylic acid or a salt thereof, methacrylic acid or a salt thereof, acrylamide, and methacrylamide.

7. The method according to claim 1 or 2, wherein the surface active agent has an HLB of 9 to 17.

8. The method according to claim 2, wherein the second-stage polymerization reaction is repeated two to four times.

* * * * *